(12) United States Patent
Koiji

(10) Patent No.: US 12,298,446 B2
(45) Date of Patent: May 13, 2025

(54) OBJECT DETECTION APPARATUS, OBJECT DETECTION METHOD, AND STORAGE MEDIUM

(71) Applicant: SUBARU CORPORATION, Tokyo (JP)

(72) Inventor: Masayoshi Koiji, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/248,657

(22) PCT Filed: Nov. 8, 2021

(86) PCT No.: PCT/JP2021/041021
§ 371 (c)(1),
(2) Date: Apr. 11, 2023

(87) PCT Pub. No.: WO2023/079749
PCT Pub. Date: May 11, 2023

(65) Prior Publication Data
US 2024/0369694 A1    Nov. 7, 2024

(51) Int. Cl.
*G01S 7/527* (2006.01)
*G01S 15/42* (2006.01)
(Continued)

(52) U.S. Cl.
CPC ............ *G01S 7/5273* (2013.01); *G01S 15/42* (2013.01); *G01S 15/66* (2013.01); *G01S 15/931* (2013.01); *G01S 2015/937* (2013.01)

(58) Field of Classification Search
CPC ...... G01S 7/5273; G01S 15/42; G01S 15/931; G01S 15/46; G01S 15/465; G01S 5/22
See application file for complete search history.

(56) References Cited

U.S. PATENT DOCUMENTS

| 9,541,644 B2* | 1/2017 | Hoenes | G01S 15/003 |
| 2015/0097704 A1* | 4/2015 | Kwon | G01S 7/4808 340/932.2 |

(Continued)

FOREIGN PATENT DOCUMENTS

| JP | 2019-082436 A | 5/2019 |
| JP | 2019-095302 A | 6/2019 |

OTHER PUBLICATIONS

Office Action dated Oct. 1, 2024, from corresponding Japanese Application No. 2023-557593, 5 pages.
(Continued)

*Primary Examiner* — John A Tweel, Jr.
(74) *Attorney, Agent, or Firm* — Rimon P.C.

(57) ABSTRACT

A computer is configured to calculate an object position based on output signals received from multiple ultrasonic sensors, set the number of successive detection time periods in which a moving distance of the object position is less than or equal to a predetermined distance as a main count value, calculate a tentative object position on the output signal from one of the ultrasonic sensors and a set auxiliary line, set the number of successive detection time periods in which a moving distance of the tentative object position is less than or equal to a predetermined distance as a sub-count value, use the sub-count value as a backup of the main count value, and finalize the object detection when the main count value becomes a predetermined value.

17 Claims, 10 Drawing Sheets

(51) Int. Cl.
  *G01S 15/66* (2006.01)
  *G01S 15/931* (2020.01)

(56) References Cited

U.S. PATENT DOCUMENTS

2016/0116586 A1* 4/2016 Fukuman ............... G08G 1/166
                                                    367/99
2020/0025864 A1* 1/2020 Gibeau ............. B62D 15/0285
2021/0405186 A1* 12/2021 Kim ........................ G01S 15/87

OTHER PUBLICATIONS

"Object Detecting Device, Object Detecting Method, and Storage Medium", Transmittal Letter of Non-patent Literature dated on Oct. 1, 2024, in JP2023-557593.

* cited by examiner

[FIG. 1]
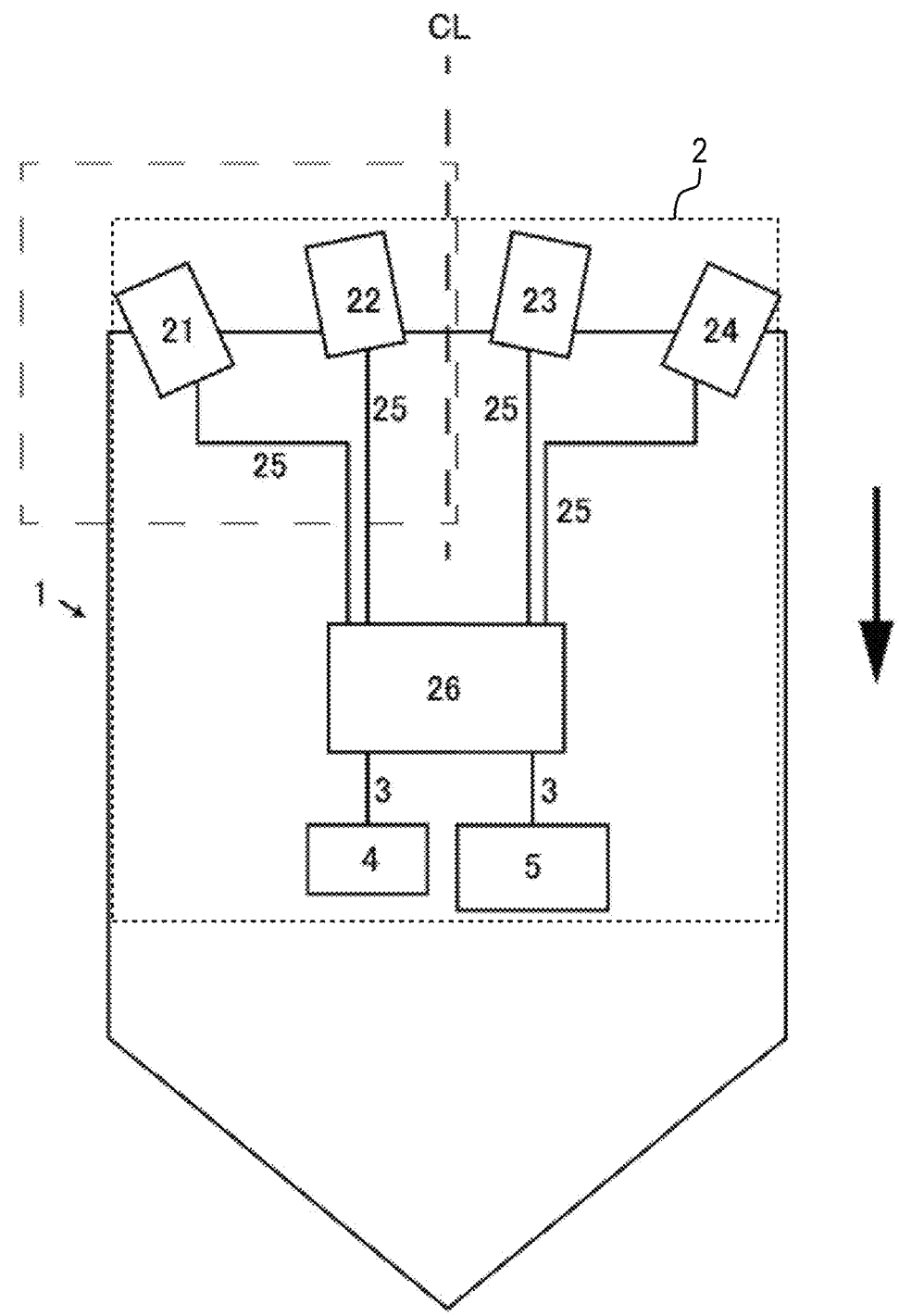

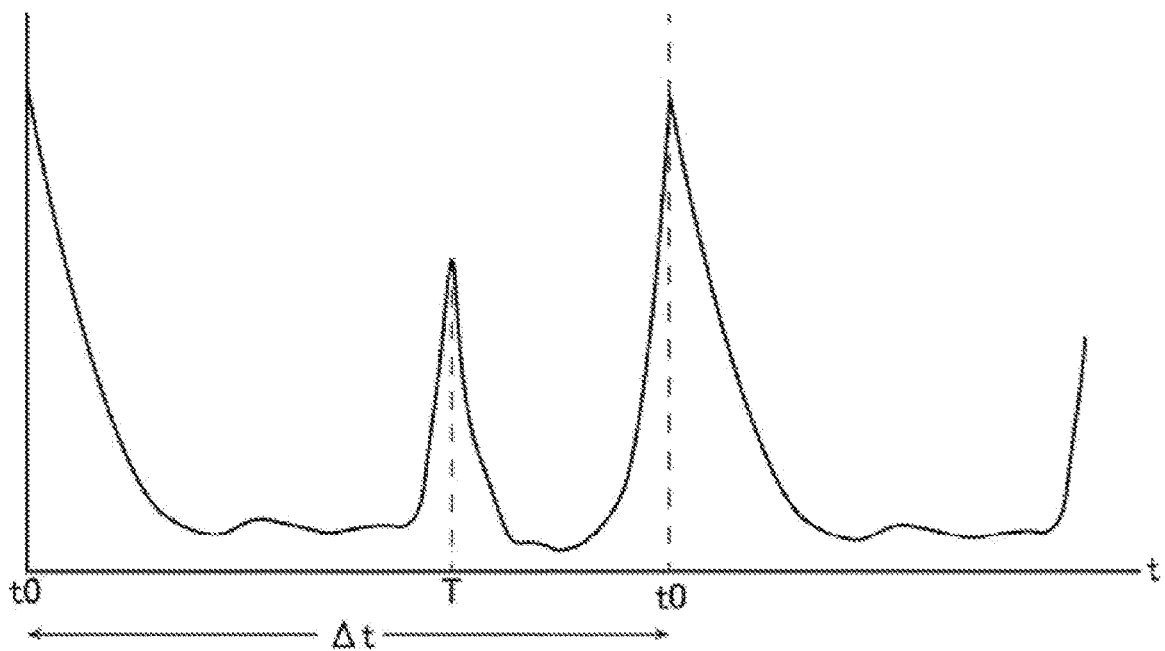
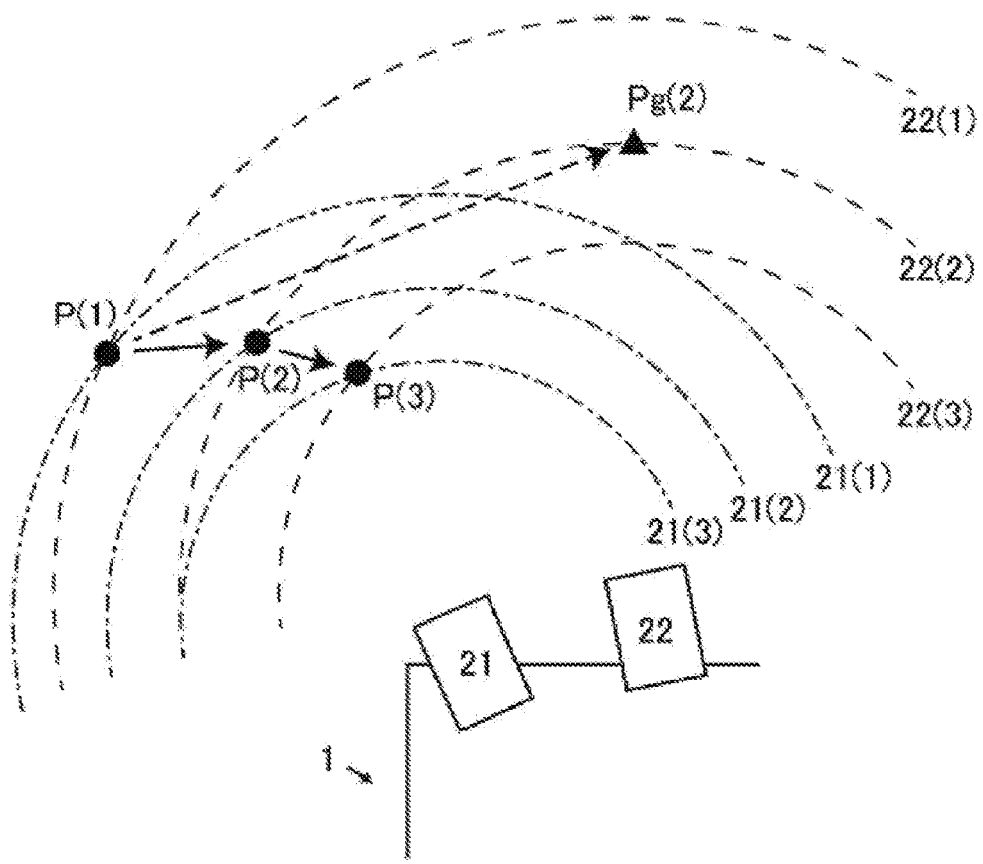

[ FIG. 4 ]
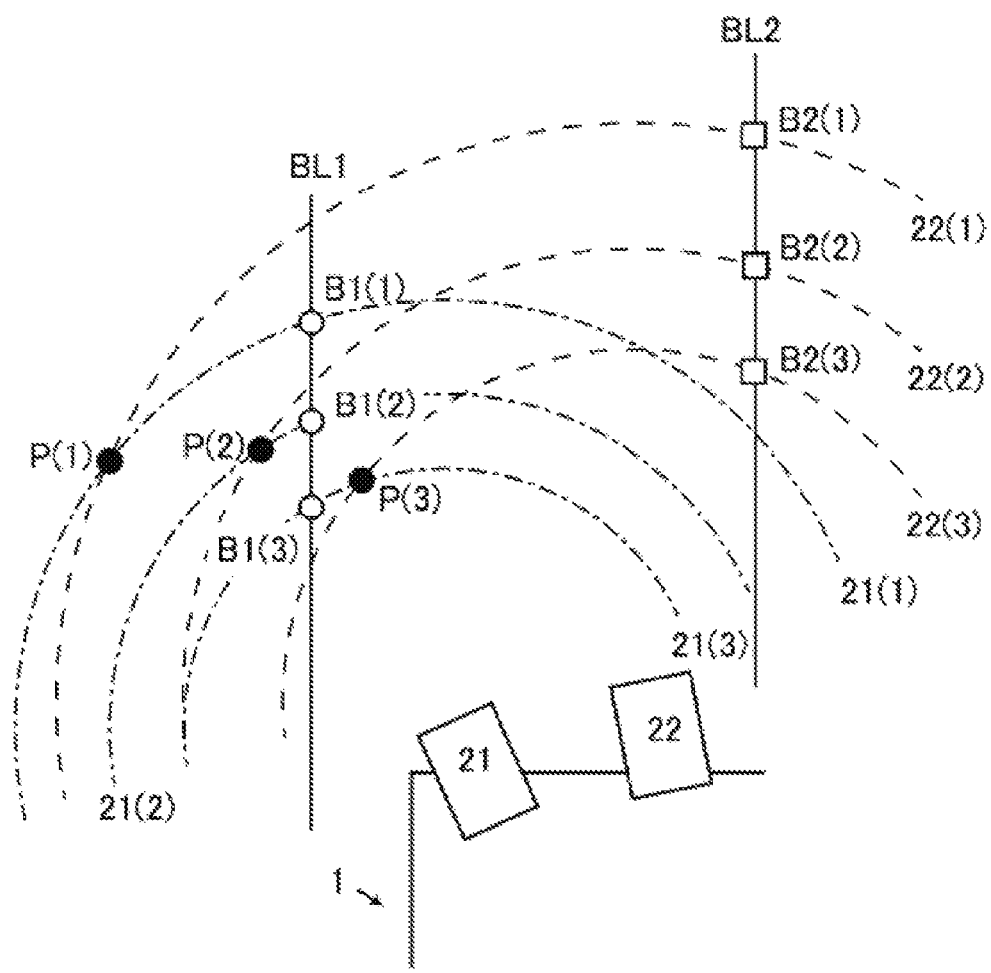

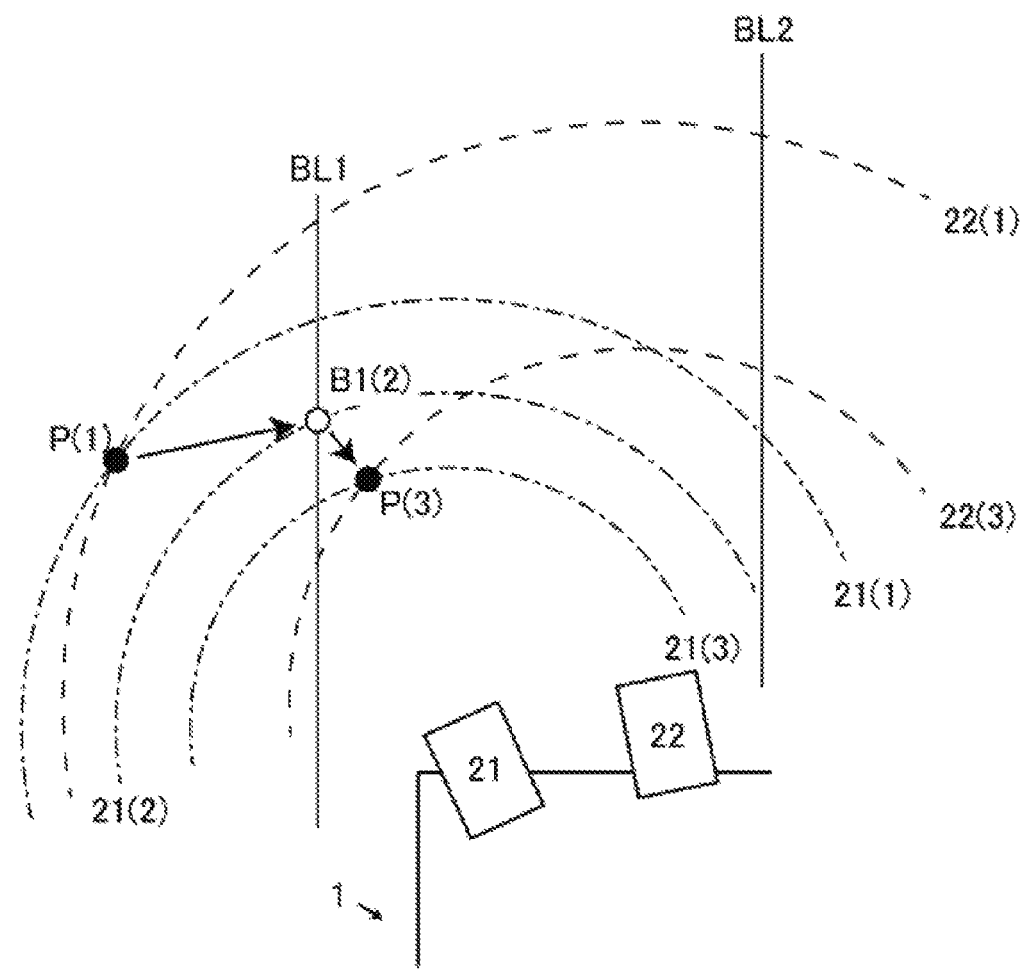
[ FIG. 5 ]

[ FIG. 6 ]
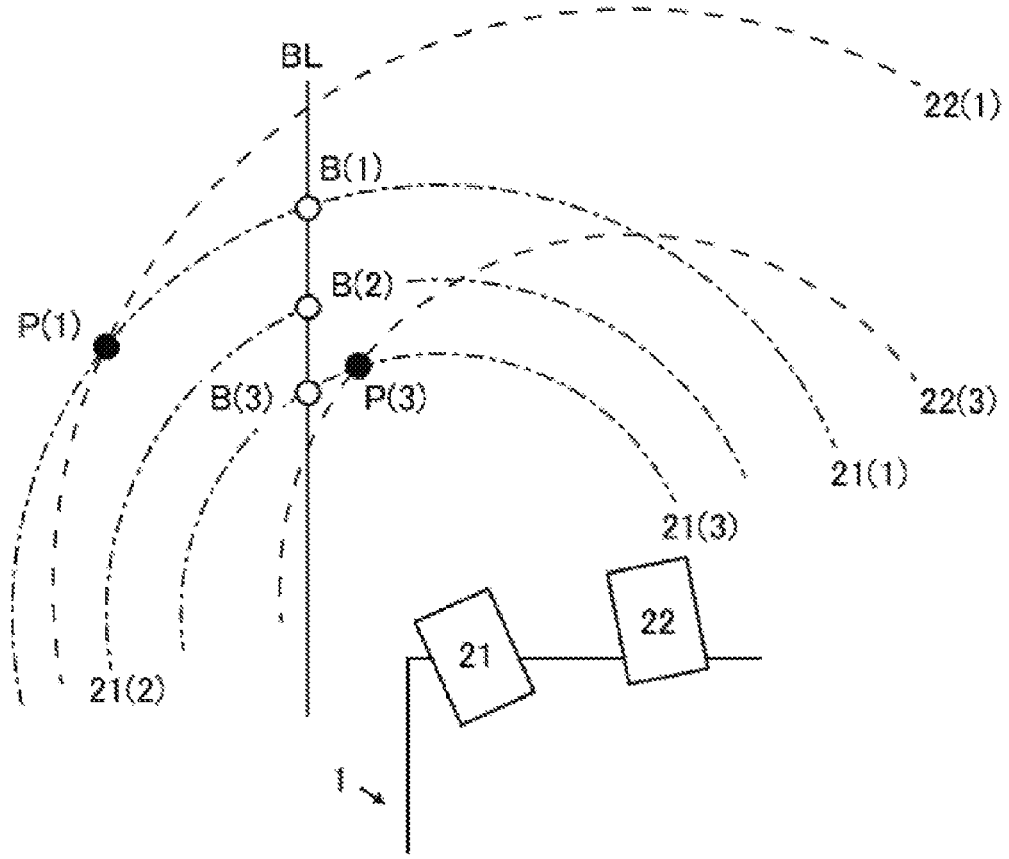

[FIG. 7]
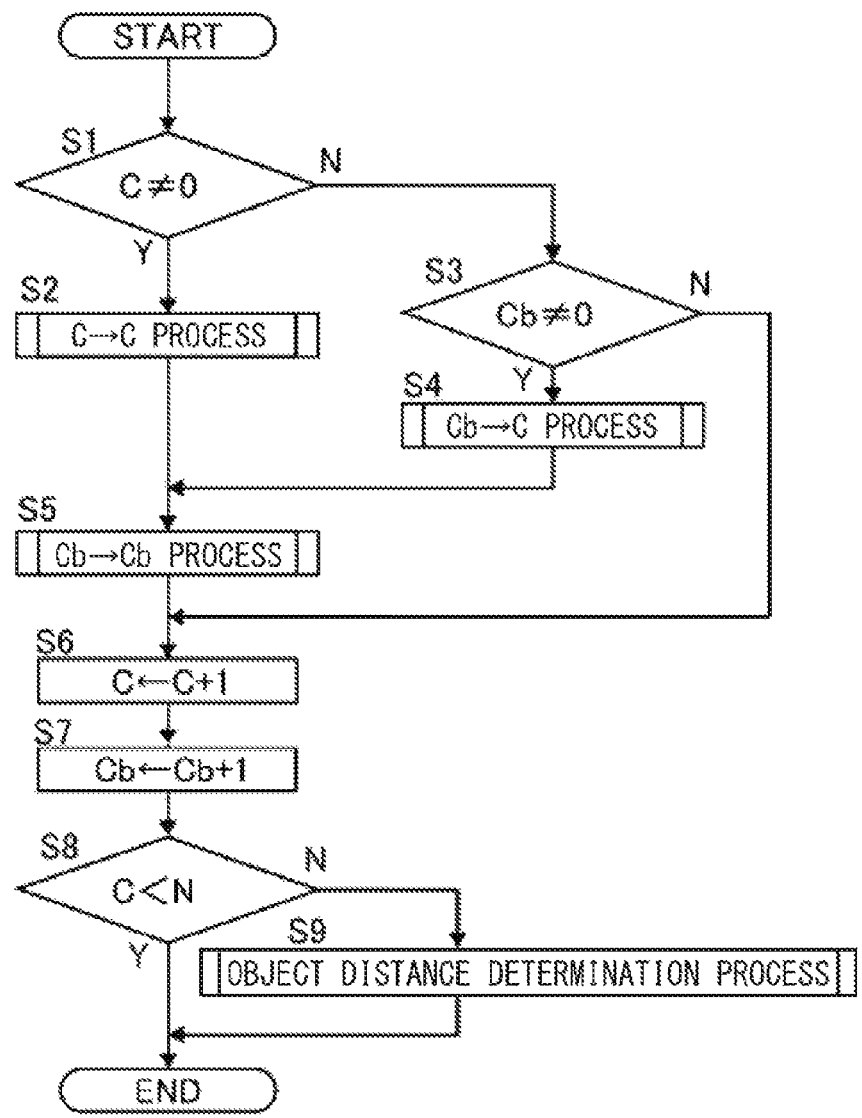

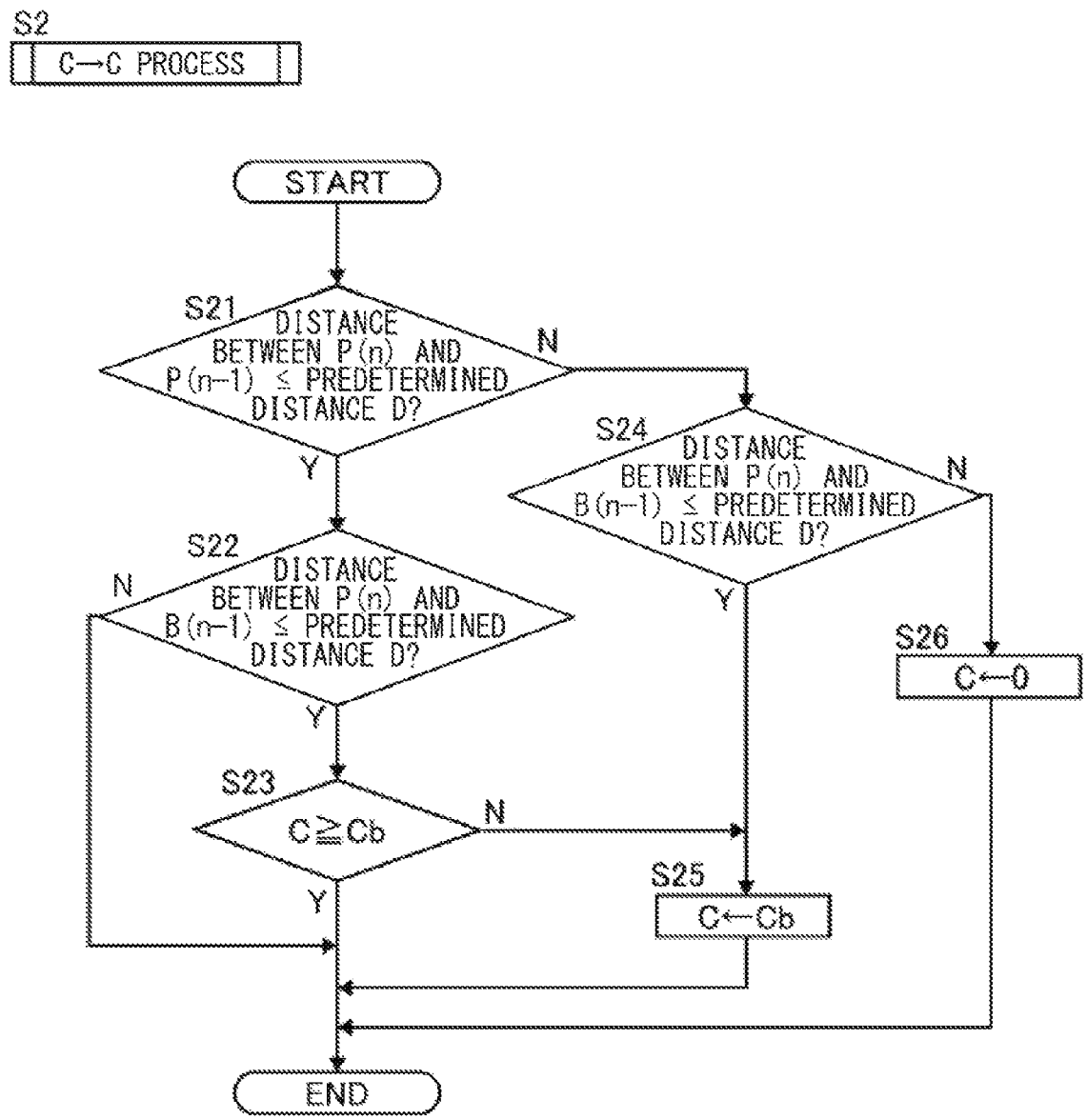
[FIG. 8]

[ FIG. 9 ]
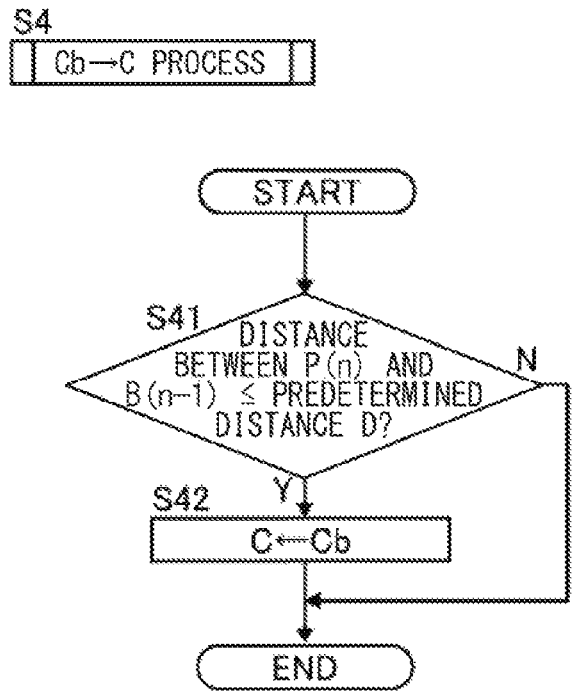
[ FIG. 10 ]
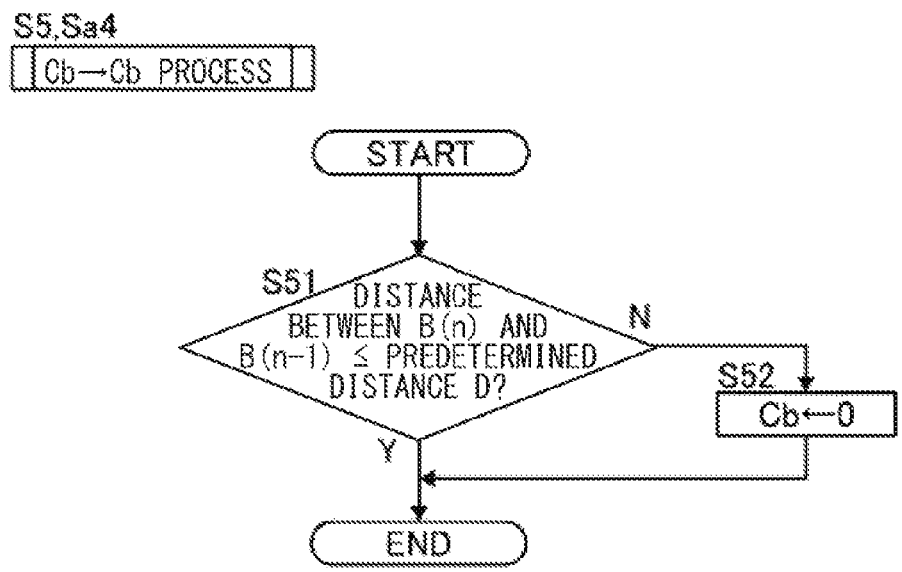

[ FIG. 11 ]
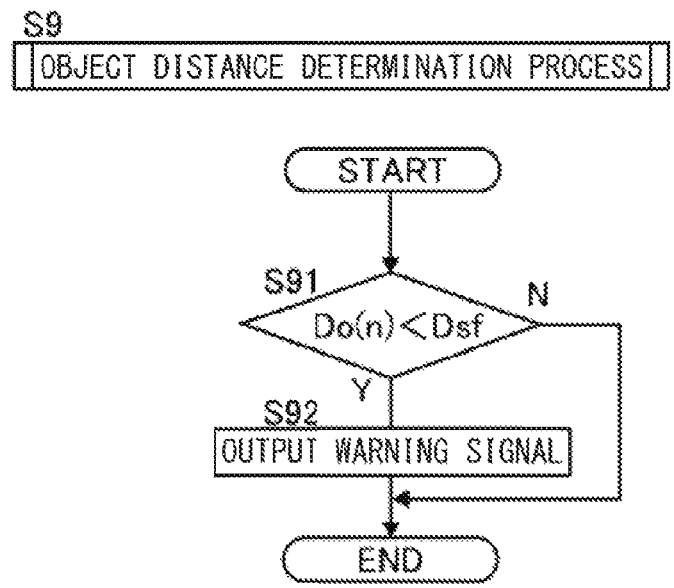
[ FIG. 12 ]
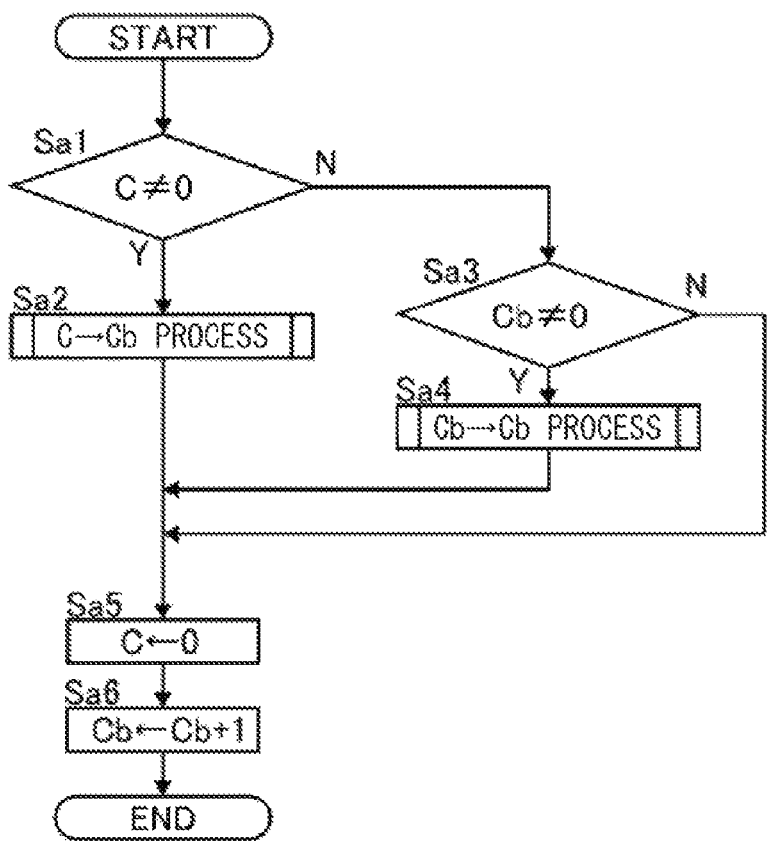

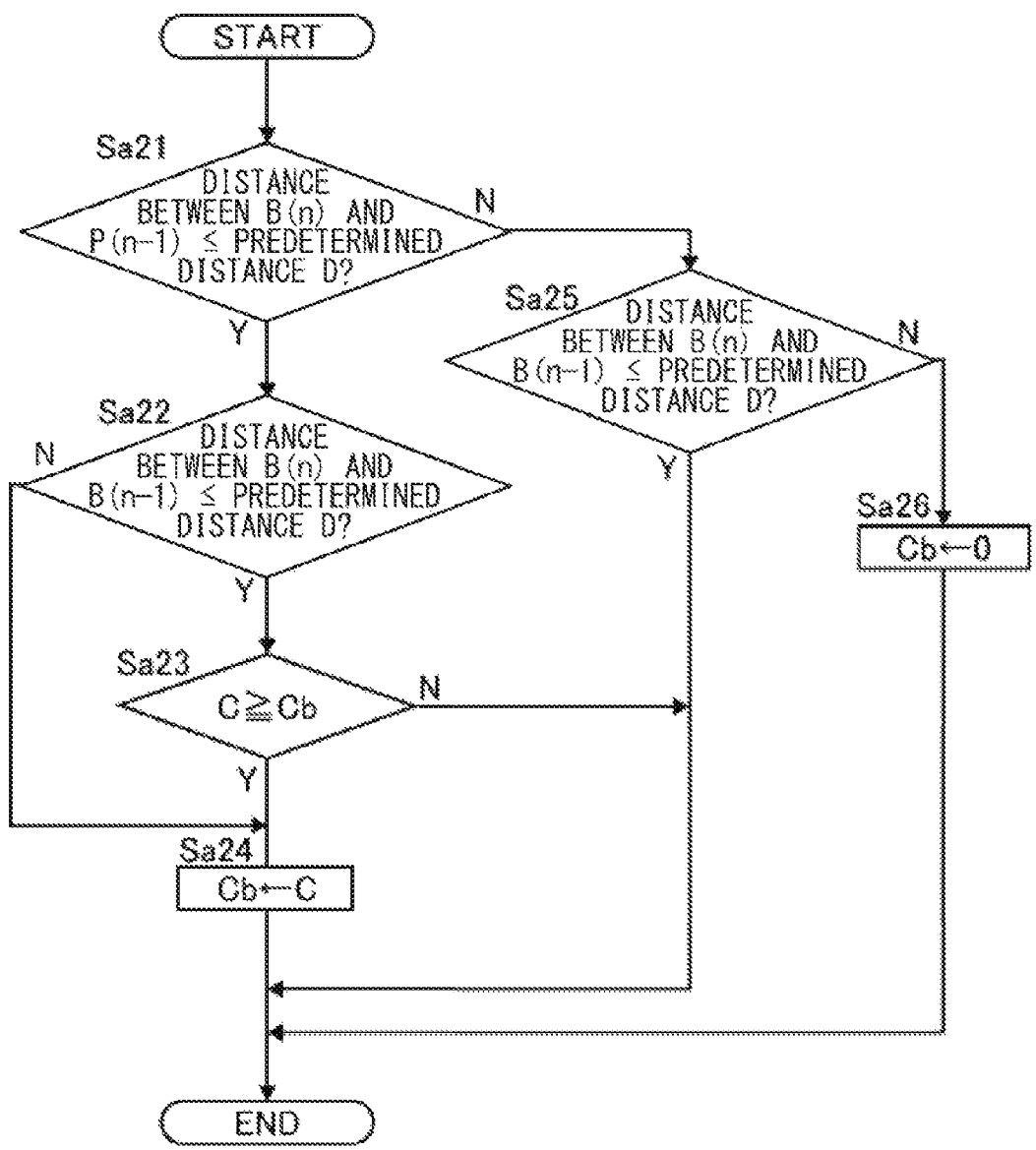
[FIG. 13]

OBJECT DETECTION APPARATUS, OBJECT DETECTION METHOD, AND STORAGE MEDIUM

CROSS REFERENCE TO RELATED APPLICATIONS

This application is the U.S. National Phase under 35 U.S.C. § 371 of International Application No. PCT/JP2021/041021, filed on Nov. 8, 2021, the entire contents of each are hereby incorporated by reference.

TECHNICAL FIELD

The present invention relates to an object detection apparatus, an object detection method, and a storage medium each of which uses an ultrasonic sensor.

BACKGROUND ART

An object detection apparatus is known which detects an object using an ultrasonic sensor that transmits an ultrasonic wave and receives a reflective wave reflected from the object. The object detection apparatus detects the object on the basis of the result of reception of the reflective wave at the ultrasonic sensor. If an object is present within a detection range of the ultrasonic sensor when the ultrasonic sensor transmits an ultrasonic wave, the ultrasonic wave transmitted is incident on the object and reflected from the object. As a result, the ultrasonic sensor receives the reflective wave to thereby detect the object.

CITATION LIST

Patent Literature

Patent Literature 1: Japanese Unexamined Patent Application Publication No. 2019-82436

SUMMARY OF INVENTION

Problem to be Solved by the Invention

Patent Literature 1 describes an object detection apparatus which includes a transmission-reception unit that outputs a signal in accordance with sound pressure of an ultrasonic wave. The invention described in Patent Literature 1 determines that an object is present in a surrounding area of a vehicle in a case where the number of times when multiple conditions regarding the results of determination by a distance determination unit are satisfied is greater than or equal to a predetermined time, for example. However, in some cases, ultrasonic waves are reflected also from a ground surface, for example, and the reflective waves are continuously received as noises by the ultrasonic sensor even though no object is present. This can result in erroneous detection. An object of the present invention is to detect an object early while suppressing erroneous detection due to noises or other factors.

Means for Solving the Problem

A computer is configured to calculate an object position based on output signals received from multiple ultrasonic sensors, set the number of successive detection time periods in which a moving distance of the object position is less than or equal to a predetermined distance as a main count value, calculates a tentative object position based on the output signal received from one of the multiple ultrasonic sensors and a set auxiliary line, set the number of successive detection time periods in which a moving distance of the tentative object position is less than or equal to a predetermined distance as a sub-count value, use the sub-count value as a backup of the main count value, and finalize object detection when the main count value becomes equal to a predetermined value.

BRIEF DESCRIPTION OF DRAWINGS

FIG. 1 is a diagram illustrating a system configuration of a vehicle.

FIG. 2 is a diagram illustrating an exemplary waveform received by ultrasonic sensors.

FIG. 3 is an explanatory diagram of detection of an object moving closer to the vehicle from behind a right rear portion of the vehicle.

FIG. 4 is a diagram for describing auxiliary lines to be used in a case where no ultrasonic wave is received by an ultrasonic sensor.

FIG. 5 is an explanatory diagram illustrating the use of an auxiliary line in a case where no reception is made by a second ultrasonic sensor.

FIG. 6 is an explanatory diagram of the object detection using a main counter and a sub-counter.

FIG. 7 is a main flowchart of the object detection to be performed when a reflective wave is received by both of the ultrasonic sensors.

FIG. 8 is a flowchart of a "C->C process".

FIG. 9 is a flowchart of a "Cb->C process".

FIG. 10 is a flowchart of a "Cb->Cb process".

FIG. 11 is a flowchart of an "object distance determination process".

FIG. 12 is a main flowchart of the object detection to be performed when a reflective wave is received by one of the ultrasonic sensors.

FIG. 13 is a flowchart of a "C->Cb process".

MODES FOR CARRYING OUT THE INVENTION

FIG. 1 illustrates a system configuration of a vehicle 1 on which an object detection apparatus 2 for a vehicle is mounted. An arrow on the right side indicates a frontward direction of the vehicle 1. The vehicle 1 includes four ultrasonic sensors that are provided from left to right on a rear portion of the vehicle 1: a first ultrasonic sensor 21, a second ultrasonic sensor 22, a third ultrasonic sensor 23, and a fourth ultrasonic sensor 24. The first ultrasonic sensor 21, the second ultrasonic sensor 22, the third ultrasonic sensor 23, and the fourth ultrasonic sensor 24 are coupled to an ECU 26 with sensor signal lines 25. The ECU 26 is a computer. The ECU 26 receives output signals from the first to fourth ultrasonic sensors 21 to 24. The ECU 26 is coupled to a sound generator 4 and a brake system 5 with signal lines 3.

The fourth ultrasonic sensor 24 and the first ultrasonic sensor 21 are disposed symmetrically about a central axis CL of the vehicle 1, and the third ultrasonic sensor 23 and the second ultrasonic sensor 22 are disposed symmetrically about the central axis CL of the vehicle 1. The fourth ultrasonic sensor 24 and the third ultrasonic sensor 23 have the same functions as the first ultrasonic sensor 21 and the second ultrasonic sensor 22. Thus, the first ultrasonic sensor 21 and the second ultrasonic sensor 22 within a dot-line box are described.

The ECU 26 generates an ultrasonic wave from the first ultrasonic sensor 21 intermittently. The ECU 26 then detects a position of an object moving closer to the vehicle 1 on the basis of a delay time of a reflective wave received by the first ultrasonic sensor 21 and the second ultrasonic sensor 22. The position may be defined by coordinates in the front, back, left, and right directions with respect to the vehicle 1. The ECU 26 outputs a warning signal when detecting an object moving closer to the vehicle 1, e.g., when the distance between the position of the object and the outer surface of the vehicle 1 is less than or equal to a predetermined distance.

FIG. 2 illustrates an exemplary waveform received by the ultrasonic sensors. A horizontal axis represents time, and a vertical axis represents the intensity of a received wave. An ultrasonic wave in a pulse form is repeatedly generated in every detection time period $\Delta t$. The detection time period $\Delta t$ is set to be sufficiently longer than the delay time from transmission of an ultrasonic wave to reception of a reflective wave. In FIG. 2, a generated ultrasonic wave is detected near or at a time t0, and a reflective wave is detected at a delay time T. Thus, the distance to the object may be measured on the basis of the delay time T and sound speed in the air. Thereafter, the distance is measured in the subsequent detection time periods: a detection time period (1), a detection time period (2), . . . a detection time period (n) (where n is a natural number). FIGS. 3 to 6 each illustrate a situation where the vehicle 1 is moving back while curving.

Objection Detection Using Two Ultrasonic Sensors

The coordinate of the object is located on a circular-arc curve having a radius of the measured distance from the center which is the reception position of the ultrasonic sensor. With reference to FIG. 3, a description is made below of object position detection in three successive detection time periods including the detection time period (1), the detection time period (2), and the detection time period (3) each having a length $\Delta t$.

A curve 21(1) is a circular arc having a radius of the distance obtained from the delay time T of reception of a reflective wave at the first ultrasonic sensor 21 in the detection time period (1). Similarly, a curve 21(2) and a curve 21(3) are circular arcs obtained in the detection time period (2) and the detection time period (3), respectively. A curve 22(1) is a circular arc having a radius of the distance obtained from a delay time of reception of a reflective wave at the second ultrasonic sensor 22 in the detection time period (1). Similarly, a curve 22(2) and a curve 22(3) are circular arcs obtained in the detection time period (2) and the detection time period (3), respectively. When an ultrasonic wave is received in the detection time period (1), an object position is detected on a coordinate P(1) at an intersection between the curve 21(1) and the curve 22(1). Similarly, when an ultrasonic wave is detected in the detection time period (2), the object position is detected on a coordinate P(2) at an intersection between the curve 21(2) and the curve 22(2). When an ultrasonic wave is emitted in the detection time period (3), the object position is detected on a coordinate P(3) at an intersection between the curve 21(3) and the curve 22(3). Thus, the object position moves as illustrated by arrows in FIG. 3.

In a case where a condition that the distance between the coordinates detected in two successive detection time periods is less than or equal to a predetermined distance is satisfied a predetermined number of times, there is little possibility of noise detection. Thus, the object detection may be finalized. For example, in a case where the moving distance of the object position between the detection time period (1) and the detection time period (2), and the moving distance of the object position between the detection time period (2) and the detection time period (3) are less than or equal to the predetermined distance, i.e., in a case where the number of successive detection time periods in which the moving distance of the object position between two adjacent detection time periods is less than or equal to the predetermined distance is 3, the object detection is finalized. The number is not limited to 3, and the object detection may be finalized in a case where the number is N (where N is a natural number greater than or equal to 2). As N increases, there is less possibility of noise detection, but a longer time is taken.

However, the object detection apparatus detects a ghost due to noise waves reflected from a road surface, for example, in some cases. With reference to FIG. 3, for example, in a case where a ghost is detected on a coordinate Pg(2) due to, for example, a noise reflective wave in the detection time period (2), an object is detected at two different coordinates, i.e., the coordinate Pg(2) and the coordinate P(2) obtained on the basis of an actual reflective wave. Here, in a case where the moving distance between the coordinate detected in a former detection time period and the coordinate detected in a later detection time period, which is indicated by a dot arrow, is greater than a predetermined distance, the coordinate detected in the later detection time period is excluded as a ghost. The coordinate Pg(2) obtained in the detection time period (2) is excluded because the moving distance from the coordinate P(1) obtained in the detection time period (1) is greater than a predetermined distance D, whereas the coordinate P(2) is employed and stored because the coordinate P(2) is remote from the coordinate P(1) by a distance less than or equal to the predetermined distance.

In a case where an object is detected in the detection time period (1), the ECU 26 stores the coordinate P(1) and sets a count value C to 1. In a case where the object is detected also in the next detection time period (2), the ECU 26 determines whether the moving distance of the object from the coordinate P(1) to the coordinate P(2) is less than or equal to the predetermined distance. If the moving distance is less than or equal to the predetermined distance, the ECU 26 adds 1 to the count value C. In contrast, if the moving distance is not less than or equal to the predetermined distance, the ECU 26 resets the count value C. The same applies to the next detection time period (3). In a case where all of the moving distances are less than or equal to the predetermined distance, the count value C increases from 1 to 3 from the detection time period (1). When the count value becomes 3 or greater, the object detection is finalized. In a case where the detection is finalized because of the count value C of 3 or greater and where a coordinate P(n) of the object position is within a predetermined range from the vehicle 1, the ECU 26 outputs a signal. The signal is used to warn an excessive approach of the object to the vehicle 1, for example.

For example, in a case where no detection is made by either one of the first ultrasonic sensor 21 and the second ultrasonic sensor 22 in the detection time period (2), the count value C is reset. This results in a delay in finalizing the object detection. In a case where the coordinate P(2) is not detected in the detection time period (2), the counter is reset, and the count value C varies like 1, 0, 1, 2, 3. Thereafter, the object detection is finalized in a detection time period (5). In a case where the coordinate P(2) is detected, the count value C varies like 1, 2, 3, and the object detection is finalized in the detection time period (3). Accordingly, in a case where no reception is made by the first ultrasonic sensor 21 or the second ultrasonic sensor 22 and thus the coordinate P(2) is not detected in the detection time period (2), the time of finalizing the object detection is delayed by a time 2Δt.

Object Detection Using Auxiliary Line

To obtain a coordinate even in a case where no reflective wave is detected by one of the first ultrasonic sensor 21 and the second ultrasonic sensor 22, an auxiliary line is set. In FIG. 4, a straight line BL1 extending on a side of the first ultrasonic sensor 21 in a backward direction of the vehicle 1 and a straight line BL2 extending on a side of the second ultrasonic sensor 22 in the backward direction of the vehicle 1 are set as auxiliary lines. The straight line BL1 is set on the side of the vehicle 1 in parallel to the central line CL. The straight line BL2 is set on a side of the second ultrasonic sensor 22 adjacent to the central line CL and in parallel to the central line CL. Accordingly, regardless of whether or not the second ultrasonic sensor 22 receives a reflective wave, coordinates B1(1), B1(2), and B1(3) of a first tentative object position may be detected on respective intersections between the straight line BL1 and the curves 21(1), 21(2), and 21(3) obtained as a result of the reception at the first ultrasonic sensor 21. In addition, regardless of whether or not the first ultrasonic sensor 21 receives a reflective wave, coordinates B2(1), B2(2), and B2(3) of a second tentative object position may be detected on respective intersections between the straight line BL2 and the curves 22(1), 22(2), and 22(3) obtained as a result of the reception at the second ultrasonic sensor 22.

In some cases, no ultrasonic wave is received by the second ultrasonic sensor 22 in the detection time period (2) as illustrated in FIG. 5, and thus the curve 22(2) illustrated in FIG. 4 is not obtained. In this case, the coordinate P(2) of the object position is not obtained. Thus, using the straight line BLI in place of the curve 22(2), the coordinate B1(2) of the first tentative object position is obtained from the intersection between the curve 21(2) and the straight line BL1, as illustrated in FIG. 5. As a result, the coordinates P(1), B1(2), and P(3) are obtained as indicated by arrows. In a case where the distance from the coordinate P(1) of the object position to the coordinate B1(2) of the first tentative object position is less than or equal to the predetermined distance and where the distance from the coordinate B1 of the first tentative object position to the coordinate P(3) of the object position is less than or equal to the predetermined distance D, the count value C is 3, and thus the object detection is finalized. Further, the coordinate of the second tentative object position may be obtained using the straight line BL2 in a case where no ultrasonic wave is received by the first ultrasonic sensor 21 and where an ultrasonic wave is received only by the second ultrasonic sensor 22.

However, as illustrated in FIG. 4, the distance from the coordinate P(1) to the coordinate B1(2) is larger than the distance from the coordinate P(1) to the coordinate P(2) at high possibility. In addition, the distance from the coordinate P(1) to the coordinate B1(2) may be longer than the predetermined distance D. If the predetermined distance D is set at a longer distance so as to include such a distance in order to prevent the count value C from being easily reset, a ghost is detected at high possibility.

Object Detection Using Backup Sub-Counter

In preparation for the case where no reflective wave is received by the second ultrasonic sensor 22, two counters, i.e., a main counter and a sub-counter are used. The sub-counter stores a sub-count value Cb calculated from the straight auxiliary line BL illustrated in FIG. 6 and the curve indicating a possible object position obtained from the reflective wave received by the first ultrasonic sensor 21. The sub-count value Cb is used as a backup. As long as the first ultrasonic sensor 21 receives a reflective wave, the sub-count value Cb is counted up regardless of the reception at the second ultrasonic sensor 22.

FIG. 6 illustrates a case where no ultrasonic wave is detected by the second ultrasonic sensor 22 in the detection time period (2). In accordance with the transition from the detection time period (1) via the detection time period (2) to the detection time period (3), the sub-count value Cb of the sub-counter, serving as as a backup, varies like 1, 2, 3. The main count value C of the main counter is supposed to vary like 1, 0, 1; however, in fact, the main count value C varies like 1, 2, 3 by copying the sub-count value Cb in the detection time period (2). When the main count value C becomes the predetermined value of 3, the object detection is finalized.

Next, the above-described flow is described with reference to a flowchart. The coordinate of an intersection between a curve 21(n) and a curve 22(n) obtained from the reflective wave received by the first ultrasonic sensor 21 and the second ultrasonic sensor 22 in an nth cycle (where n is a natural number) is represented as a coordinate P(n) of an object position. In addition, the coordinate of an intersection between the curve 21(n) obtained by the first ultrasonic sensor 21 and the straight line BL1, which is an imaginary auxiliary line, is represented as a coordinate B(n) of a tentative object position.

Upon activation of the vehicle 1, the ECU 26 sets the main count value C of the main counter to 0, and sets the sub-count value of the sub-counter to 0. The ECU 26 then calculates the coordinate P(n) of the object position and the coordinate B(n) of the tentative object position from the signals received from the first ultrasonic sensor 21 and the second ultrasonic sensor 22 in every detection time period (n). In a case where both of the first ultrasonic sensor 21 and the second ultrasonic sensor 22 receive a reflective wave and where the coordinate P(n) of the object position is calculated, a first flow is performed. In contrast, in a case where no reflective wave is detected by the second ultrasonic sensor 22 and a reflective wave is detected only by the first ultrasonic sensor 21 and where the coordinate B(n) of the tentative object position is calculated, a second flow is performed. The ECU 26 repeatedly selects the first flow or the second flow on the basis of the status of the coordinate calculation in every detection time period (n). The first flow is illustrated in FIGS. 7 to 11, and the second flow is illustrated in FIGS. 12 and 13.

Described first is the first flow to be performed in a case where both of the first ultrasonic sensor 21 and the second ultrasonic sensor 22 receive reflective waves and where the coordinate P(n) of the object position and the coordinate B(n) of the tentative object position are calculated. FIG. 7 illustrates a main flow of the first flow. In the main flow of the first flow, the main count value C and the sub-count value Cb are subjected to processing. Thereafter, 1 is added to each of the main count value C and the sub-count value Cb. When the main count value C becomes greater than or equal to a predetermined value N, an object distance determination process is performed.

Default values of the main count value C and the sub-count value Cb are 0. If the main count value C is 0 in Step S1, the flow proceeds to Step S3. If the main count value C is not 0, a "C->C process" is performed in Step S2, and the flow then proceeds to Step S5 in which a "Cb->Cb process" is performed. Thereafter, the main count value C and the sub-count value Cb are increased by 1 in Step S6 and Step S7, respectively.

If the sub-count value Cb is 0 in Step S3, the main count value C and the sub-count value Cb are increased by 1 in Step S6 and Step S7, respectively. If the sub-count value Cb is not 0, a "Cb->C process" is performed in Step S4, following which the "Cb->Cb process" is performed in Step S5. Thereafter, the main count value C and the sub-count value Cb are increased by 1 in Step S6 and S7, respectively. After Step S7, the main count value C is compared with the set predetermined value N (where N is a natural number greater than or equal to 2) in Step S8. If the main count value C is less than the predetermined value N, the flow ends. In contrast, if the main count value C is greater than or equal to N, the "object distance determination process" is performed in Step S9.

In the "C->C process" in Step S2 illustrated in FIG. 8, if the coordinate P(n) of the object position is far from both of a coordinate P(n−1) of an object position and a coordinate B(n−1) of a tentative object position, the main count value C is reset. Further, if the coordinate P(n) of the object position is close to the coordinate B(n−1) of the tentative object position, a larger one of the main count value C and the sub-count value Cb is set as a new main count value C.

The "C->C process" is performed if the main count value C is not 0. This means that the coordinate P(n−1) of the object position and the coordinate B(n−1) of the object position have been calculated in the detection time period (n−1). In Step S21, a determination is made as to whether the distance from the coordinate P(n−1) to the coordinate P(n) of the object position calculated in the detection time period (n) is less than or equal to the predetermined distance D. If the distance is less than or equal to the predetermined distance D, the flow proceeds to Step S22. In contrast, if the distance is not less than or equal to the predetermined distance D, the flow proceeds to Step S24.

The coordinate B(n−1) of the tentative object position has been calculated in the detection time period (n−1). In Step S22, a determination is made as to whether the distance between the coordinate P(n) of the object position and the coordinate B(n−1) of the tentative object position is less than or equal to the predetermined distance D. If the distance is less than or equal to the predetermined distance D, the flow proceeds to Step S23. In contrast, if the distance is not less than or equal to the predetermined distance D, the flow ends. In Step S23, a determination is made as to whether the main count value C is greater than or equal to the sub-count value Cb. If the result of the determination is Yes, the flow ends. In contrast, the result of the determination is No, the flow proceeds to Step S25. In a case where the flow proceeds to Step S25, the coordinate P(n) of the object position is far from the coordinate P(n−1) of the previous object position and close to the coordinate B(n−1) of the previous tentative object position. In this case, the sub-count value Cb is set as a new main count value C in Step S25, and the flow ends.

In Step S24, a determination is made as to whether the distance between the coordinate P(n) of the object position and the coordinate B(n−1) of the tentative object position is less than or equal to the predetermined distance D. If the distance is less than or equal to the predetermined distance D, the flow proceeds to Step S25 in which the sub-count value Cb is set as a new main count value C, and the flow ends. If the distance is not less than or equal to the predetermined distance in Step S24, the flow proceeds to Step S26 in which the main count value C is set to 0, and the flow ends. In Step S26, the coordinate P(n) is far from the coordinate P(n−1) and the coordinate B(n−1), and thus the main count value C is not able to be taken over from the previous detection time period (n−1). Accordingly, the main count value C is reset to 0 once, and counting is restarted from 1.

In the "Cb->C process" in Step S4 illustrated in FIG. 9, if the coordinate P(n) of the object position is close to the coordinate B (n−1) of the tentative object position, the sub-count value Cb is set as a new main count value C. In Step S41, a determination is made as to whether the distance between the coordinate P(n) of the object position and the coordinate B(n−1) of the tentative object position is less than or equal to a predetermined distance D. If the distance is less than or equal to the predetermined distance D, the sub-count value Cb is set as a new main count value C in Step S42, and the flow ends. If the distance is not less than or equal to the predetermined distance D, the flow ends as it is.

In the "Cb->Cb process" in Step S5 illustrated in FIG. 10, the sub-count value Cb is reset in a case were the moving distance of the tentative object position is long. In Step S51, a determination is made as to whether the distance between the coordinate B(n) and the coordinate B (n−1) is less than or equal to the predetermined distance D. If the distance is less than or equal to the predetermined distance D, the flow ends as it is. In contrast, if the distance is not less than or equal to the predetermined distance D, the sub-count value Cb is set to 0 in Step S52, and the flow ends.

In the object distance determination process in Step S9 illustrated in FIG. 11, a determination is made as to whether a warning signal is to be outputted. In Step S91, an object distance Do(n) from the vehicle 1 to the coordinate P(n) of the object position is compared with an allowable distance Dsf which is a sixth predetermined distance. If the object distance Do(n) is less than the allowable distance Dsf, the flow proceeds to Step S92 in which a warning signal is outputted, and the flow ends. If the object distance Do(n) is greater than or equal to the object distance Do(n), the flow ends as it is.

FIGS. 12 and 13 illustrate the second flow to be performed in a case where no reflective wave is received by the second ultrasonic sensor 22 and a reflective wave is received only by the first ultrasonic sensor 21, and where the coordinate B(n) of the tentative object position is calculated. The flow illustrated in FIG. 10 is included in the second flow. FIG. 12 illustrates a main flow of the second flow. In the main flow of the second flow, the main count value C and the sub-count value Cb are subjected to processing. Because the coordinate P(n) of the object position has not been calculated, the main count value C is thereafter reset. Because the coordinate B(n) of the tentative object position has been calculated, 1 is added to the sub-count value Cb.

If the main count value C is 0 in Step Sa1, the flow proceeds to Step Sa3. If the sub-count value Cb is 0 in Step Sa3, the main count value C is set to 0 in Step Sa5, and 1 is added to the sub-count value Cb in Step Sa6. If the sub-count value Cb is not 0, the "Cb->Cb process" is performed in Step Sa4, following which the main count value C is set to 0 in Step Sa5, and 1 is added to the sub-count value Cb in Step Sa6. The "Cb->Cb process" in Step Sa4 is the same as the process in Step S5 described with reference to FIG. 10. If the main count value C is not 0 in Step Sa1, the "C->Cb process" is performed in Step Sa2, following which the main count value C is set to 0 in Step Sa5, and 1 is added to the sub-count value Cb in Step Sa6.

In the "C->Cb process" in Step Sa2 illustrated in FIG. 13, if the coordinate B(n) of the tentative object position is far from both of the coordinate P(n−1) of the object position and the coordinate B(n−1) of the tentative object position, the sub-count value Cb is reset. Further, if the moving distance of the tentative object position is long, the main count value C is set as a new sub-count value Cb.

In Step Sa21, a determination is made as to whether the distance between the coordinate B(n) of the tentative object position and the coordinate P(n−1) of the object position is less than or equal to the predetermined distance D. If the distance is less than or equal to the predetermined distance D, the flow proceeds to Step Sa22. In contrast, if the distance is not less than or equal to the predetermined distance D, the flow proceeds to Step Sa25. In Step Sa22, a determination is made as to whether the distance between the coordinate B(n) of the tentative object position and the coordinate B(n−1) of the tentative object position is less than or equal to the predetermined distance D. If the distance is less than or equal to the predetermined distance D, the flow proceeds to Step Sa23. In contrast, if the distance is not less than or equal to the predetermined distance D, the value of the main count value C is copied to the sub-count value Cb to set a new sub-count value Cb in Step Sa24, and the flow ends. In Step Sa23, a determination is made as to whether the main count value C is greater than or equal to the sub-count value Cb. If the result of the determination is Yes, the value of the main count value C is copied to the sub-count value Cb in Step Sa24, and the flow ends. In contrast, if the result of the determination is No, the flow ends.

In Step Sa25, a determination is made as to whether the distance between the coordinate B(n) of the tentative object position and the coordinate B(n−1) of the tentative object position is less than or equal to the predetermined distance D. If the distance is less than or equal to the predetermined distance D, the flow ends. In contrast, if the distance is not less than or equal to the predetermined distance D, the sub-count value Cb is reset in Step Sa26, and the flow ends.

In the embodiment, the predetermined distance D regarding the moving distance of the object position detected in adjacent detection time periods, the predetermined distance D regarding the moving distance of the tentative object position, the predetermined distance D regarding the distance from the object position to the tentative object position, and the predetermined distance D regarding the distance from the tentative object position to the object position are common to each other. However, different distances such as a first predetermined distance D1, a second predetermined distance D2, a third predetermined distance D3, and a fourth predetermined distance D4 may be used for the respective distances. Alternatively, a common predetermined distance may be used for some of these distances. The same applies to a fifth predetermined distance described below.

In the embodiment described above, a single sub-count value Cb of the sub-counter is calculated using a single auxiliary line BL. However, as illustrated in FIG. 4, the second auxiliary line BL2 may be provided for the second ultrasonic sensor 22, and a second sub-count value Cb2 may be stored in another sub-counter.

Copying not only the sub-count value Cb but also the second sub-count value Cb2 to the main count value C helps prevent the object from being lost and the object detection from being finalized at a delayed timing. In this case, a second tentative object position B2(n) is calculated on the basis of an output signal from the second ultrasonic sensor and the second auxiliary line BL2 set. Thereafter, the number of successive detection time periods in which the moving distance of the second tentative object position is less than or equal to the fifth predetermined distance is set as the second sub-count value Cb2. Further, the largest one of the main count value C, the sub-count value Cb, and the second sub-count value Cb2 is stored as a new main count value C.

Although some embodiments of the present invention are described above with reference to the drawings, specific configurations are not limited to these embodiments, and the present invention includes modifications of design or the like made within a range not departing from the gist of the present invention. Further, the above-described embodiments can be combined by diverting the technologies to each other as long as there is no particular contradiction or problem in the purpose, configuration, or the like.

In the embodiment, the ultrasonic sensor is disposed on the rear portion of the vehicle 1. Thus, the ultrasonic sensor is effective not only when the vehicle 1 is moved in the backward direction with a steering operation performed but also when the vehicle 1 is moved straight in the backward direction. Alternatively, the sensor may be disposed on a front portion or a side portion of the vehicle 1 to detect an approach of an object. In the embodiment, the first ultrasonic sensor 21 generates an ultrasonic wave; however, the second ultrasonic sensor 22 or another ultrasonic wave generator may generate an ultrasonic wave. In a case where a position at which an ultrasonic wave is generated is shifted from a position at which the ultrasonic wave is received, a more accurate curve on which an object is possibly present may be calculated on the basis of a travel distance, a generation position, and a reception position of the ultrasonic wave without using an arc having a center at the reception position. Further, the present invention is applicable to not only a vehicle but also a robot cleaning apparatus, for example.

The auxiliary line may be a curve line. In the embodiment, two ultrasonic sensors are used to determine the object position; however, three or more ultrasonic sensors may be used to determine the object position. The flows described above may be stored for use as an object detection program in a storage medium.

DESCRIPTION OF REFERENCE NUMERALS

1; Vehicle
2; Object detection apparatus for vehicle
21; First ultrasonic sensor
22; Second ultrasonic sensor
23; Third ultrasonic sensor
24; Fourth ultrasonic sensor
25; Sensor signal line
26; ECU
3; Signal line
4; Sound generator
5; Brake system
C; Main count value
Cb; Sub-count value

The invention claimed is:

1. An object detection apparatus comprising:
a computer;
a first ultrasonic sensor; and
a second ultrasonic sensor, wherein the computer is configured to receive output signals from the first ultrasonic sensor and the second ultrasonic sensor, and the computer is configured to calculate an object position based on the output signals received from the first ultrasonic sensor and the second ultrasonic sensor and set a number of successive detection time periods in which a moving distance of the object position is less than or equal to a first predetermined distance as a main count value, calculate a tentative object position based on the output signal received from the first ultrasonic sensor and a set auxiliary line, and set a number of successive detection time periods in which a moving distance of the tentative object position is less than or equal to a second predetermined distance as a sub-count value, use the sub-count value as a backup of the main count value, and finalize object detection when the main count value becomes equal to a predetermined value.

2. The object detection apparatus according to claim 1, wherein the sub-count value is used as the backup by setting a larger one of the main count value and the sub-count value as a new main count value.

3. The object detection apparatus according to claim 2, wherein, when a distance between the object position and the tentative object position in a next detection time period is less than or equal to a third predetermined distance, the sub-count value is set as the new main count value.

4. The object detection apparatus according to claim 3, wherein a larger one of the main count value and the sub-count value is set as a new sub-count value.

5. The object detection apparatus according to claim 4, wherein, when a distance between the tentative object position and the object position in a next detection time period is less than or equal to a fourth predetermined distance, the main count value is set as the new sub-count value.

6. The object detection apparatus according to claim 1, wherein a second tentative object position is calculated based on the output signal from the second ultrasonic sensor and a set second auxiliary line, a number of successive detection time periods in which a moving distance of the second tentative object position is less than or equal to a fifth predetermined distance is set as a second sub-count value, and the sub-count value is used as the backup by storing a largest one of the main count value, the sub-count value, and the second sub-count value as a new main count value.

7. The object detection apparatus according to claim 1, wherein the first ultrasonic sensor and the second ultrasonic sensor are both disposed on a rear portion or a front portion of a vehicle.

8. The object detection apparatus according to claim 7, wherein a position of the second ultrasonic sensor is closer to a central axis of the vehicle than a position of the first ultrasonic sensor is.

9. The object detection apparatus according to claim 1, wherein a signal is outputted when the object position obtained when the detection is finalized is distant from a vehicle by a sixth predetermined distance or less.

10. An object detection method comprising:

calculating an object position based on output signals received from a first ultrasonic sensor and a second ultrasonic sensor and setting a number of successive detection time periods in which a moving distance of the object position is less than or equal to a first predetermined distance as a main count value, calculating a tentative object position based on the output signal received from the first ultrasonic sensor and a set auxiliary line, and setting a number of successive detection time periods in which a moving distance of the tentative object position is less than or equal to a second predetermined distance as a sub-count value, using the sub-count value as a backup of the main count value, and finalizing object detection when the main count value becomes equal to a predetermined value.

11. The object detection method according to claim 10, wherein the sub-count value is used as the backup by setting a larger one of the main count value and the sub-count value as a new main count value.

12. The object detection method according to claim 11, wherein, when a distance between the object position and the tentative object position in a next detection time period is less than or equal to a third predetermined distance, the sub-count value is set as the new main count value.

13. The object detection method according to claim 12, wherein a larger one of the main count value and the sub-count value is set as a new sub-count value.

14. The object detection method according to claim 13, wherein, when a distance between the tentative object position and the object position in a next detection time period is less than or equal to a fourth predetermined distance, the main count value is set as the new sub-count value.

15. The object detection method according to claim 10, wherein a second tentative object position is calculated based on the output signal from the second ultrasonic sensor and a set second auxiliary line, a number of successive detection time periods in which a moving distance of the second tentative object position is less than or equal to a fifth predetermined distance is set as a second sub-count value, and the sub-count value is used as the backup by storing a largest one of the main count value, the sub-count value, and the second sub-count value as a new main count value.

16. The object detection method according to claim 10, wherein a signal is outputted when the object position obtained when the detection is finalized is distant from a vehicle by a sixth predetermined distance or less.

17. A non-transitory tangible machine-readable storage medium storing an object detection program, when executed, causing a computer to:

calculate an object position based on output signals received from a first ultrasonic sensor and a second ultrasonic sensor and sets a number of successive detection time periods in which a moving distance of the object position is less than or equal to a first predetermined distance as a main count value, calculate a tentative object position based on the output signal received from the first ultrasonic sensor and a set auxiliary line, and set a number of successive detection time periods in which a moving distance of the tentative object position is less than or equal to a second predetermined distance as a sub-count value, use the sub-count value as a backup of the main count value, and finalize object detection when the main count value becomes equal to a predetermined value.

\* \* \* \* \*